Patented Jan. 25, 1938

2,106,294

UNITED STATES PATENT OFFICE 2,106,294

PROCESS OF MAKING DRY LIME SULPHUR COMPOSITIONS

Charles I. Chubbuck, San Marino, Calif.

No Drawing. Application May 17, 1933,
Serial No. 671,517

4 Claims. (Cl. 71—4)

This invention relates to dry lime sulphur compositions and the manufacture thereof.

An object of my invention is the production of a dry lime sulphur composition which may be used dry in the soil as a plant food and soil corrective, that is, as a fertilizer, and which may also be used either alone or in connection with other materials as a dry dust spray for insecticidal purposes, and which has other uses as well.

Another object of the invention is the production of lime sulphur compositions which may contain sulphur as calcium thiosulphate, calcium sulphate, calcium sulphite, calcium monosulphide and calcium polysulphides.

Another object of this invention is the production of such lime sulphur compounds directly in a dry, granular, or powdery condition.

Another object of the invention is the production of such compounds which can not only be prepared, but which can be kept, in a finely divided or pulverized form.

Another object of the invention is the production of such compounds in such a form that when exposed to water they will be partially soluble and partially insoluble therein.

Other objects of the invention will be apparent on reading the appended specification.

The above described composition of matter may be manufactured by various processes. According to one process, quicklime, that is, calcium oxide, is slaked in water and allowed to settle in bins, the supernatant liquid being allowed to drain off or being otherwise suitably removed. This leaves what may be described as a lime putty, it being a more or less wet mass of calcium hydroxide; and to ten parts by weight of such lime putty, which contains about fifty per cent (50%) to sixty per cent (60%) of free water, one part by weight of sulphur is added and intermixed therewith, the more finely divided the sulphur is, the better and more uniformly it will react with the lime. This mixed mass is then dried, preferably in a rotary drier heated with a direct flame which is hot enough not only to dry the mass but to speed up the reaction between the lime and the sulphur; it being understood, of course, that the heat should not be sufficient to volatilize or burn out the sulphur. The mass, after drying, is ground or otherwise reduced to a powder and sacked.

A reaction takes place between the lime and the sulphur, which reaction may begin in the mixing bin and continue during the drying and pulverizing steps, but at any rate the main portion of the reaction occurs during the drying stage.

The composition prepared as just described is found in a typical instance to analyze approximately as follows:

| | Percent |
|---|---|
| Calcium oxide | 59.30 |
| Elemental sulphur | 3.15 |
| Sulphite sulphur | 2.21 |
| Sulphate sulphur | 3.44 |
| Thiosulphate sulphur | 3.80 |
| Carbon dioxide | 3.63 |
| Loss on ignition | 23.28 |
| | 98.81 |

This totals 98.81% and it is to be understood that such analysis is only approximate and that no attempt has been made to indicate the exact form in which the various constituents named may be present.

Another process of manufacture is to mix or grind sulphur with the quicklime before slaking it, and then this pre-mixed mass of sulphur and quicklime may be treated with water in a hydrator. According to another process, sulphur and lime are simultaneously run into the hydrator, water being added to slake the lime in the presence of the sulphur.

In either of the two last mentioned processes, the amount of water added may be just about that required to slake the quicklime. A great deal of heat is developed by this slaking reaction, causing the mass to become quite hot, which results in a loss of sulphur. Such loss may be avoided by using an excess of water, which keeps down the temperature developed, but it is preferred that such excess be not greater than the amount the heat of reaction will drive off, to leave a dry product. More might, of course, be used but it is desired to avoid if possible the additional drying step which would be required.

I can thus produce a pulverulent composition consisting of or comprising calcium polysulphide with sulphur also in various other forms.

By the processes above described I can produce a lime sulphur composition having the sulphur in various forms and wherein the ultimate analysis for sulphur indicates a content as high as forty per cent (40%) to fifty per cent (50%); and I can produce a product of the various compounds above indicated which will contain sixty per cent (60%) or over of calcium polysulphide.

My novel product is advantageously used as a soil corrective in citrus groves and is much more efficient than lime and sulphur added separately. It is also very useful as a dry insecticidal dust in citrus groves, in orchards, and on vegetables, either alone or mixed with materials such as nicotine sulphate, lead arsenate, and others.

Having described my invention, what I claim is:—

1. The process of making dry lime sulphur compositions, which comprises treating calcium oxide with sufficient water to form a fluent mass of solid calcium hydroxide and water, allowing the solids to settle, removing supernatant liquid, mixing sulphur with the resulting putty-like solid, and passing said mixture through a rotary flame-heated drier.

2. The process of making dry lime sulphur compositions, which comprises treating calcium oxide with sufficient water to form a fluent mass of solid calcium hydroxide and water, allowing the solids to settle, removing supernatant liquid, mixing with the resulting putty-like solid about ten per cent. (10%) of its weight of sulphur, and passing said mixture through a rotary flame-heated drier.

3. The process of making dry lime sulphur compositions, which comprises treating calcium oxide with sufficient water to form a fluent mass of solid calcium hydroxide and water, allowing the solids to settle, removing supernatant liquid, mixing sulphur with the resulting putty-like solid, and passing said mixture through a rotary flame-heated drier having a temperature high enough to dry the mass and so low as not to volatilize or burn out the sulphur.

4. The process of making dry lime sulphur compositions, which comprises treating calcium oxide with sufficient water to form a fluent mass of solid calcium hydroxide and water, allowing the solids to settle, removing supernatant liquid, mixing with the resulting putty-like solid about ten per cent. (10%) of its weight of sulphur, and passing said mixture through a rotary flame-heated drier having a temperature high enough to dry the mass and so low as not to volatilize or burn out the sulphur.

CHARLES I. CHUBBUCK.